Aug. 30, 1932.  R. REID  1,875,149
INTERNAL COMBUSTION MOTOR
Filed May 1, 1931  3 Sheets-Sheet 2

Inventor
Robert Reid
By Clarence A. O'Brien
Attorney

Inventor
Robert Reid
By Clarence A O'Brien
Attorney

Patented Aug. 30, 1932

1,875,149

UNITED STATES PATENT OFFICE

ROBERT REID, OF MUSKEGON, MICHIGAN

INTERNAL COMBUSTION MOTOR

Application filed May 1, 1931. Serial No. 534,378.

This invention relates to an internal combustion motor, the general object of the invention being to provide a chamber in the inner end of a cylinder of the motor which acts as a compression chamber in which gas or an explosive mixture is compressed on the down stroke of the piston with valve controlled means for introducing the compressed mixture from the chamber into the combustion chamber, and with valve controlled means for controlling the introduction of the mixture into the compression chamber. Thus the lower end of the cylinder acts as a supercharger in connection with the piston.

This invention also consists in certain other features of construction and in the combination and arrangement of the several parts, to be hereinafter fully described, illustrated in the accompanying drawings, and specifically pointed out in the appended claim.

In describing the invention in detail, reference will be had to the accompanying drawings wherein like numerals denote like or corresponding parts throughout the several views, and in which:—

Figure 1:
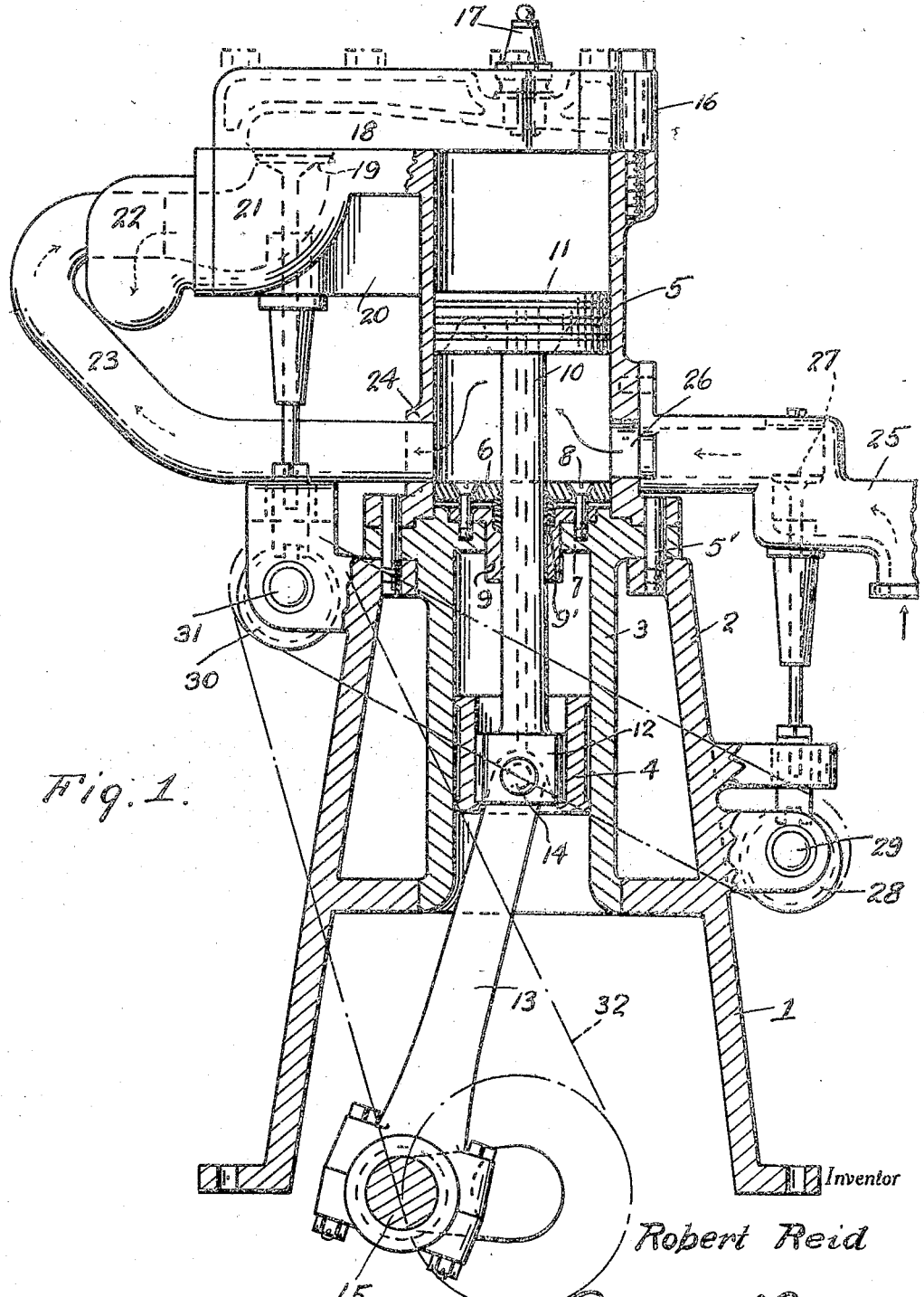
Figure 1 is a vertical sectional view of the invention with parts in elevation.
Figure 2:
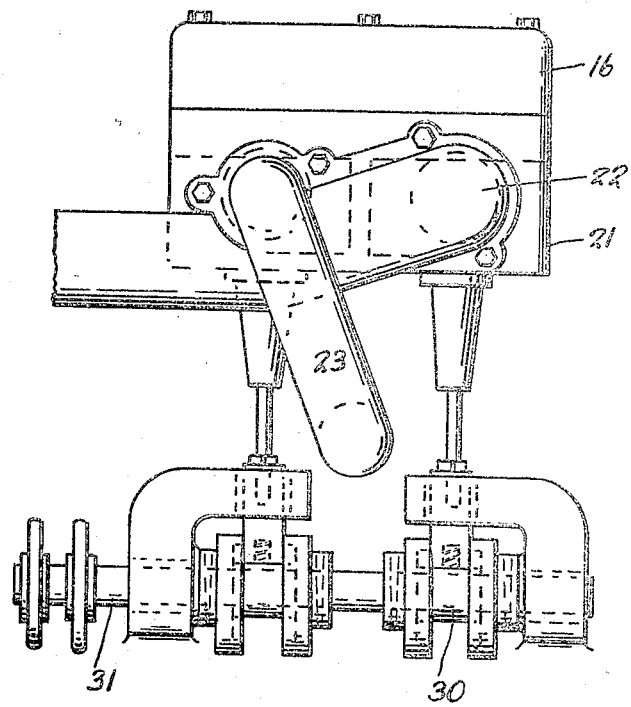
Fig. 2 is an elevational view showing the inlet and exhaust means for the combustion chamber.
Figure 7:
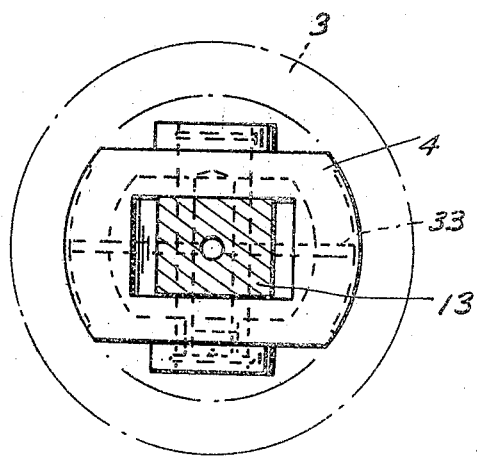
Fig. 7 is a sectional view on the line 7—7 of Fig. 5.
Figure 6:
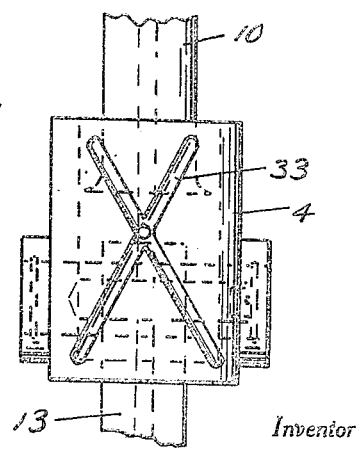
Fig. 6 is a side view of the cross head, this being taken at right angles.
Figure 3:
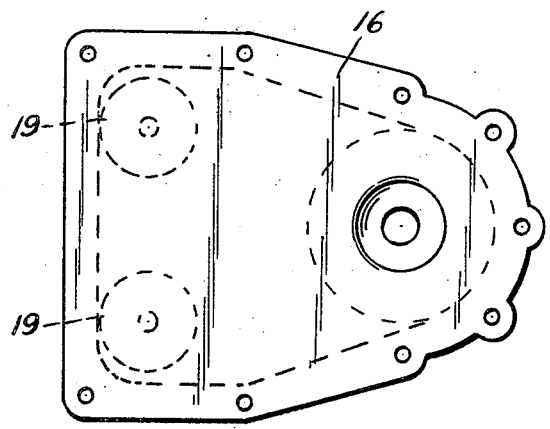
Fig. 3 is a top plan view.
Figure 4:
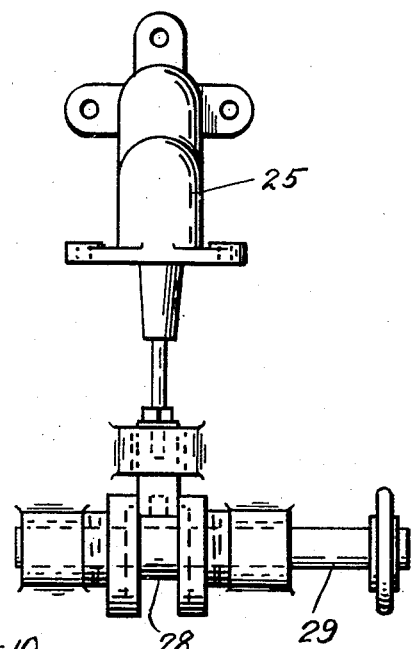
Fig. 4 is a view showing the means for controlling the introduction of fluid into the compression chamber.
Figure 5:
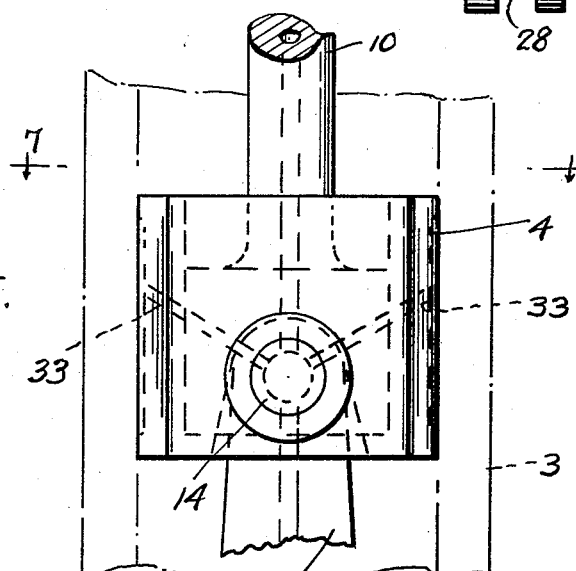
Fig. 5 is a detail view showing the cross head which connects the lower end of the piston rod to the rod which is connected with the crank shaft.

In these drawings, the numeral 1 indicates the upper part of the crank case which is formed with the extension 2 having therein the tubular guide 3 for the cross head 4 and the numeral 5 indicates the cylinder which is supported on the flange formed on the head 7 of the guide 3, said flange resting on the upper end of the extension 2. This flange and the flange on the bottom of the cylinder 5 are connected to an internal flange at the upper end of the extension 2 by lugs 5'. The plate 6 fits in the lower end of the cylinder 5 and a packing gland 9 passes through the head 7 and screws 8 pass through the plate 6 and the flange of the gland into the head 7 to connect these parts together as shown in Figure 1. The packing material 9' has parts fitting in recesses formed in the plate 6 and the gland 9 and the piston rod 10 of the piston 11 passes through said gland and has an enlarged part 12 at its lower end which fits in the crosshead 4, and the cross head and this enlarged part are fastened to the upper end of the connecting rod 13 by the bolt 14.

The lower end of the connecting rod is connected in the usual manner with the crank shaft 15. The cylinder head is shown at 16 and has an opening therein for the spark plug 17. This head has an extension which covers the passage 18 which leads from the inlet and exhaust valves 19 to the upper end of the cylinder 5. These valves are arranged in a side extension 20 at one side of the cylinder block. This extension 20 has the inlet and exhaust passages 21 therein which are controlled by the valves 19 and an exhaust manifold 22 is connected with the exhaust passage and an inlet manifold 23 is connected with the inlet passage.

This inlet manifold 23 leads to an outlet port 24, in the bottom of the cylinder, so that the charge compressed in the lower end of the cylinder on the downstroke of the piston will flow through the manifold 23 into the inlet passage 21. A conduit 25 leads from a carbureter or the like to an inlet passage 26 in the lower end of the cylinder, and the said conduit is controlled by a valve 27.

This valve 27 is operated by a cam 28 on a shaft 29 rotatably supported from a part of the extension 2 and the valves 19 are actuated by the cams 30 on a shaft 31 rotatably supported from the extension 2. The shafts 29 and 31 are actuated from the crank shaft by the means shown generally at 32.

The oil ducts for supplying oil from the crank case to the various parts of the engine are shown at 33.

From the foregoing it will be seen that I have provided a compression chamber in the lower end of the cylinder in which the explosive mixture from the carbureter is compressed, and the flow of the mixture from the carbureter into the compression chamber is controlled by the valve 27. The mixture compressed by the downward movement of the piston is introduced into the manifold 23 and from this manifold the compressed mixture passes into the combustion chamber at the top of the cylinder from the inlet valve 19.

This engine is a four-cycle one and the lower end of the cylinder acts as a supercharger. If desired, automatic check valves can be placed in the ports 24 and 26. These check valves are not shown as they can be of the usual or any desired construction. The compressed mixture may be discharged into a common manifold for a number of cylinders, or each cylinder may have its own manifold.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:—

In an internal combustion engine, a cylinder having an extension at one side thereof formed with inlet and exhaust passages, a head on the cylinder having an extension at one side thereof extending over the extension of the cylinder and having a chamber therein in communication with the inlet and exhaust passages of the extension and with the upper end of the cylinder, inlet and exhaust valves controlling communication between the passages and said chamber, a pipe connecting the inlet passage with the lower end of the cylinder, a conduit for leading a combustible mixture into the lower end of the cylinder, a valve for controlling the conduit, a piston in the cylinder, a crank shaft, means for connecting the crank shaft with the piston, cams for operating the valve, means for operating the cams from the crank shaft.

In testimony whereof I affix my signature.

ROBERT REID.